US008025738B2

(12) United States Patent
Munden

(10) Patent No.: US 8,025,738 B2
(45) Date of Patent: Sep. 27, 2011

(54) METHOD OF TREATING A TUBULAR STRING USING A PIGTRAIN

(75) Inventor: Bruce A. Munden, Galveston, TX (US)

(73) Assignee: Misc B.V., Rijswijk (NL)

( * ) Notice: Subject to any disclaimer, the term of this patent is extended or adjusted under 35 U.S.C. 154(b) by 356 days.

(21) Appl. No.: 12/388,166

(22) Filed: Feb. 18, 2009

(65) Prior Publication Data

US 2010/0209606 A1 Aug. 19, 2010

(51) Int. Cl.
*B08B 9/055* (2006.01)
*B08B 9/057* (2006.01)
*B05C 7/08* (2006.01)
*F16L 55/26* (2006.01)

(52) U.S. Cl. ... 134/8; 134/22.11; 134/22.12; 134/22.18; 134/166 C; 15/104.061; 15/3.5

(58) Field of Classification Search ............... 134/22.11, 134/22.12, 22.18, 166 C; 15/3.5, 104.05, 15/104.061
See application file for complete search history.

(56) References Cited

U.S. PATENT DOCUMENTS

| | | | |
|---|---|---|---|
| 1,796,338 | A | 3/1931 | Moore |
| 2,707,934 | A | 5/1955 | Curtis |
| 3,108,012 | A | 10/1963 | Curtis |
| 3,394,025 | A | 7/1968 | McCune |
| 3,480,984 | A | 12/1969 | Kidd |
| 4,016,620 | A | 4/1977 | Powers |
| 4,294,869 | A | 10/1981 | Bassompierre-Sewrin |
| 4,389,461 | A | 6/1983 | Scott |
| 4,416,703 | A | 11/1983 | Scott |
| 4,425,385 | A | 1/1984 | Coulter et al. |
| 4,509,222 | A | 4/1985 | Knapp |
| 4,797,239 | A | 1/1989 | Cho |
| 5,032,185 | A | 7/1991 | Knapp |
| 5,150,493 | A | 9/1992 | Sivacoe |
| 5,230,842 | A | 7/1993 | Munde |
| 5,384,929 | A | 1/1995 | Smith |
| 5,533,224 | A | 7/1996 | Knapp |
| 5,622,570 | A | 4/1997 | Lima et al. |
| 5,625,917 | A | 5/1997 | Hawkins |
| 5,662,964 | A | 9/1997 | Zecchin |
| 5,873,390 | A | 2/1999 | Satake et al. |
| 5,895,619 | A | 4/1999 | Knapp |
| 5,967,699 | A | 10/1999 | Knapp |
| 5,983,948 | A | 11/1999 | Yagi et al. |
| 6,241,424 | B1 | 6/2001 | Bath et al. |
| 6,263,534 | B1 | 7/2001 | McCann et al. |
| 6,286,540 | B1 | 9/2001 | Bonicontro |
| 6,434,825 | B1 | 8/2002 | De Almeida |
| 6,500,271 | B1 | 12/2002 | Moore et al. |
| 7,270,847 | B2 | 9/2007 | Horn |

(Continued)

OTHER PUBLICATIONS

Girard Industries—Girard Polly-Pigs, www.girardind.com, 2000-2008.

(Continued)

*Primary Examiner* — Michael Kornakov
*Assistant Examiner* — Natasha Campbell
(74) *Attorney, Agent, or Firm* — Patterson & Sheridan, L.L.P.

(57) ABSTRACT

Embodiments of the present invention generally relate to a method of treating a tubular string using a pigtrain. In one embodiment, a method of treating a tubular string includes injecting working fluid between a lead pig and a trail pig of a pigtrain. A bypass pig of the pigtrain is in a first position between the lead pig and trail pig and closer to the lead pig. The method further includes injecting propellant behind the trail pig, thereby driving the pigtrain through the tubular string. The bypass pig gradually moves from the first position to a second position closer to the trail pig, thereby agitating the working fluid.

20 Claims, 2 Drawing Sheets

U.S. PATENT DOCUMENTS

| | | | |
|---|---|---|---|
| 7,386,908 | B2 | 6/2008 | Lino et al. |
| 2006/0068092 | A1 | 3/2006 | Horn |

OTHER PUBLICATIONS

Girard Industries—Girard Mandrel Pigs, www.girardind.com, 2000-2008.

Girard Industries—Technical Data , www.girardind.com, 2000-2008.

Girard Industries brochure—Polly-Pigs Industrial Pipeline Cleaners, 2003, 4 pages.

Girard Industries brochure—Pipeline Pigs Cleaning Batching Gauging, 2003, 4 pages.

International Search Report and Written Opinion, dated Jul. 21, 2010, International Application No. PCT/US2010/024290.

METHOD OF TREATING A TUBULAR STRING USING A PIGTRAIN

BACKGROUND OF THE INVENTION

1. Field of the Invention

Embodiments of the present invention generally relate to a method of treating a tubular string using a pigtrain.

2. Description of the Related Art

Pipeline pigs are propelled by fluid pressure through the interior of pipelines to clean wax, sludge, scale, debris, and other materials from the inner surfaces of the pipeline. Pipeline pigs may also be used to fill a pipeline with water for hydrotesting and remove the water once testing is finished. Pipeline pigs may also be used to verify tolerances of the pipeline and inspect for corrosion. Pipeline pigs may also be used to remove accumulated liquids or solids in pipelines. Pipeline pigs may also be used to separate different types of fluids which may be traveling through the same pipeline.

For certain levels of pipeline cleanliness, it is necessary to employ detergent, such as a surfactant and/or an acidic solution. Such a method is discussed and illustrated in U.S. Pat. No. 5,230,842, which is herein incorporated by reference in its entirety. The '842 patent discloses launching a pigtrain having a lead pig 72, a trail pig 72, and an acidizing fluid 74 positioned between the pigs through a pipeline 10 back and forth until a determination is made that a inner surface of the pipeline is sufficiently clean. The trail pig 72 is propelled using pressurized air supplied via the launcher.

SUMMARY OF THE INVENTION

Embodiments of the present invention generally relate to a method of treating a tubular string using a pigtrain. In one embodiment, a method of treating a tubular string includes injecting working fluid between a lead pig and a trail pig of a pigtrain. A bypass pig of the pigtrain is in a first position between the lead pig and trail pig and closer to the lead pig. The method further includes injecting propellant behind the trail pig, thereby driving the pigtrain through the tubular string. The bypass pig gradually moves from the first position to a second position closer to the trail pig, thereby agitating the working fluid.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
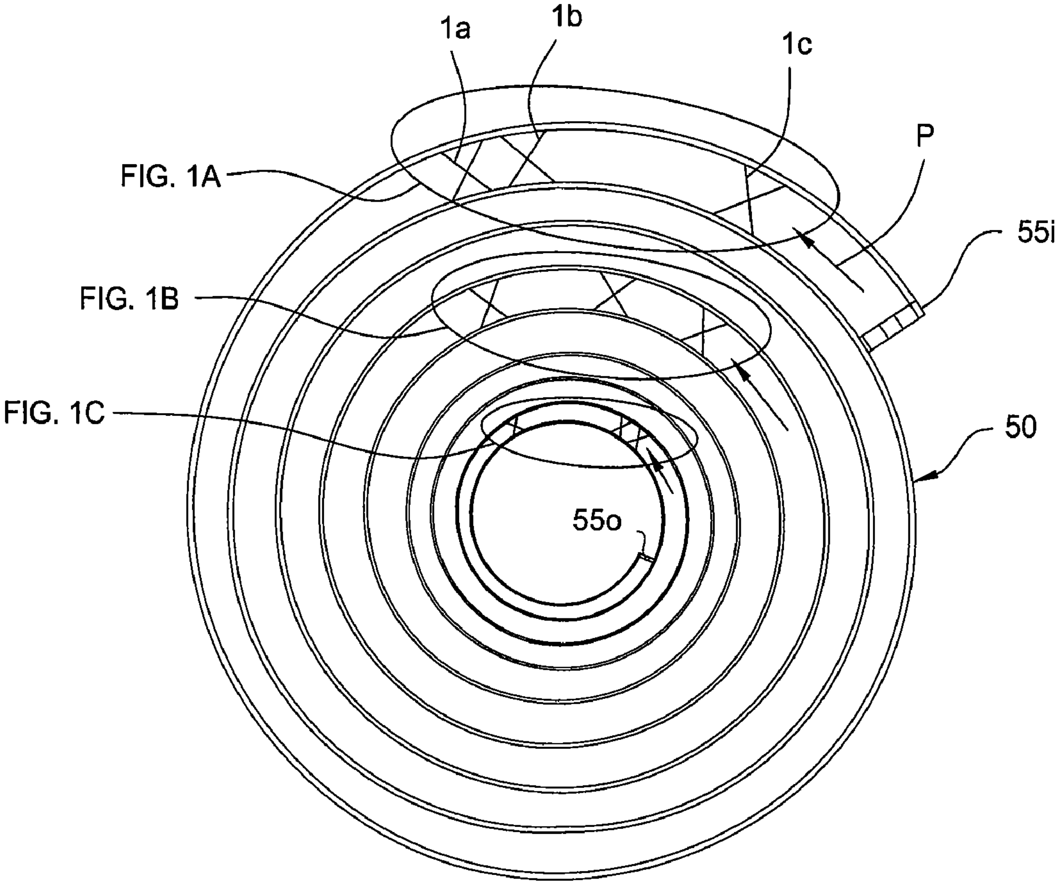
FIG. 1 illustrates three stages of a pigtrain deployed in a coiled tubing string, according to one embodiment of the present invention.
Figures 1A, 1B, 1C:
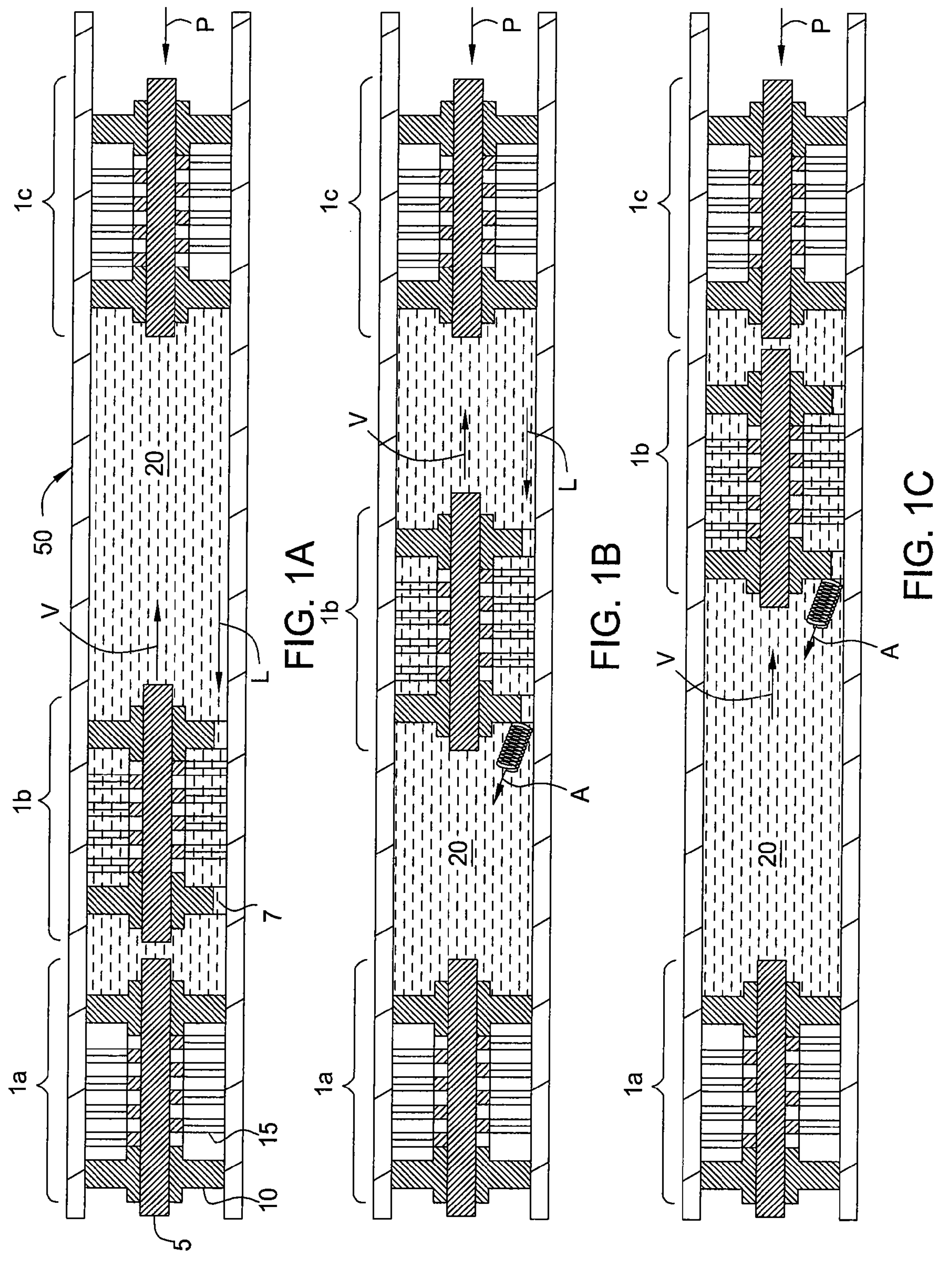
FIGS. 1A, 1B, and 1C are detailed views of each stage of FIG. 1.

FIG. 1 illustrates three stages of a pigtrain 1 deployed in a coiled tubing string 50, according to one embodiment of the present invention. FIGS. 1A, 1B, and 1C are detailed views of each stage of FIG. 1. Alternatively, the pigtrain 1 may be deployed in other tubular strings, such as a pipeline or reeled pipe. The pigtrain 1 may include a lead pig 1*a*, a bypass pig 1*b*, and a trail pig 1*c*. The lead and trail designations and inlet and outlet designations may be arbitrary as the pigtrain 1 may be bidirectional and/or the inlet 55*i* and outlet 55*o* may be reversed.

In preparing the coiled tubing 50 for deployment of the pigtrain 1, an inlet 55*i* and outlet 55*o* of the tubing 50 may be located at or near ground level to allow for easier access. A clamp (not shown) may be secured to each of the inlet 50*a* and outlet 50*b*. Each clamp may have a flange to receive corresponding flanges of a pig launcher (not shown) and a pig receiver (not shown). A suitable pig launcher and receiver are illustrated in FIGS. 1 and 9-11 of the '842 patent. The launcher and receiver designations may be arbitrary as the pigtrain 1 may be bidirectional. Each of the launcher and receiver may include a header pipe, chamber pipe, and a bumper assembly. The header pipe may include ports for venting, draining, measuring pressure, and/or injecting working fluid. The chamber may include a propellant port, one or more pressure gauge ports, and a door at an end thereof for insertion or removal of the pig. The chamber pipe may have an increased diameter relative to the header pipe and each of the launcher and receiver may further include a reducer connecting the two pipes. The inner diameter of the header pipe may correspond to the inner diameter of the coiled tubing and the inner diameter of the chamber pipe may be greater than the outer diameter of the pigtrain 1 to facilitate ease of insertion or removal of the pigtrain 1.

Each of the bumper assemblies may include a disc-shaped outer end and a disc-shaped inner end having a series of propellant transfer passages formed longitudinally therethrough. The ends may be longitudinally spaced and coupled by a central rod. Each bumper assembly may be inserted into each chamber pipe and retained therein by each door. When inserted, the outer end may abut the door and the inner end may abut the reducer. Extending from each of the inner ends may be a length adjustable rod having a bumper secured an outer end thereof and positioned within the header pipe. Each bumper may have an outer diameter less than the outer diameter of the header pipe to allow propellant flow therebetween.

To load the pigtrain 1 into the launcher, the door of the chamber pipe may be opened and the lead pig 1*a* may be rammed through the chamber pipe and the reducer and into the outer end of the header pipe. The bypass pig 1*b* may be rammed through the chamber pipe and the reducer and into the header pipe. The bypass pig 1*b* may be located closer to the lead pig 1*a* at the outer end, such as proximate to or abutting, than the inner end (where the trail pig 1*c* will be). The door may then be opened again and then trail pig 1*c* may be rammed into the inner end of the header pipe. The bumper assembly may then be inserted into the chamber pipe and the door closed. The receiver bumper assembly may also be loaded into the receiver chamber pipe and the door closed. The working fluid 20 may then be injected between the lead pig 1*a* and trail pig 1*c* until all of the air is purged.

Propellant P may be injected again into the chamber pipe to drive the pigtrain 1 through the coiled tubing. The propellant P may be a fluid, such as liquid or compressed gas, such as ambient air, dry air, or nitrogen. When the pigtrain 1 reaches the outlet 55*b*, the lead pig 1*a* may abut the receiver bumper, thereby preventing the pigtrain 1 from entering the receiver chamber pipe. At this point, the working fluid 20 between the lead pig 1*a* and trail pig 1*c* may be sampled and, if the working fluid 20 is of sufficient quality for another pass, the pigtrain 1 may be driven back through the coiled tubing 50 until the pigtrain 1 reaches the launcher bumper. This back and forth movement of the pigtrain 1 may be repeated until an inner surface of the coiled tubing 50 is sufficiently treated by the working fluid, or it becomes necessary to replace the working fluid 20.

Alternatively, the lead and bypass pigs 1*a*, 1*b* may be driven a predetermined distance along the coiled tubing 50 by the propellant before injection of the working fluid. Alternatively, the pigtrain may be launched into the tubular string without using a launcher.

Additionally, by adding a gate valve to the launcher and receiver, a second pigtrain (not shown) may be deployed in series with the pigtrain 1. The second pigtrain may include a lead pig, a trail pig, and a bypass pig disposed between the lead pig and trail pig. The second pigtrain may be deployed adjacent to the pigtrain 1 such that the second pigtrain utilizes the lead or trail pig of the pigtrain 1 as one of its members. Alternatively, the second pigtrain may be deployed a distance from the pigtrain 1 such that a cushion of propellant exists between the pigtrains. In this alternative, the second pigtrain may have its own lead pig and trail pig. The second pigtrain may have the same or different working fluid. For example, the pigtrain 1 may include detergent as the working fluid and the second pigtrain may follow with water as the working fluid to rinse the detergent.

Each pig 1*a-c* may include a mandrel 5, a front seal 10, a rear seal 10, and a scraper 15. The front and rear designations may be arbitrary as each pig 1*a-c* may be bidirectional. The mandrel 5 may be a rod having a threaded outer surface and made from a metal or alloy, such as steel. Alternatively, the mandrel 5 may be a threaded tubular capped at each longitudinal end thereof. The scraper 15 may be a brush extending along an outer surface of the mandrel 5. The brush 15 may include a base and bristles bonded thereto along a length and width thereof. The brush base may be a helically wound strip or channel made from a metal or alloy, such as steel. An inner surface of the brush base may be threaded corresponding to the threaded outer surface of the mandrel. The bristles may be made from a metal or alloy, such as steel, or a polymer.

The seals 10 of the lead 1*a* and trail 1*c* pigs may be solid whereas the seals 10 of the bypass pig may each include one or more bypasses 7. The seals 10 may each include a hub portion, a disc portion. The seals 10 may each be made from a polymer, such as polyurethane, polychloroprene, or polyisoprene. An inner surface of the hub portion may be threaded corresponding to the threaded outer surface of the mandrel 5. An inner end of each hub portion may abut a respective end of the brush base, thereby retaining the brush 15 on the mandrel 5. The bypasses 7 may each be channels formed in an outer surface of each of the disc portions and extending longitudinally therethrough. Alternatively, the bypasses 7 may each be a hole formed longitudinally through each of the seals 10. The bypasses 7 may be tangentially spaced around each of the disc portions. Alternatively, each hub may be a separate member made from a metal or alloy, such as steel, and bonded to the disc. Alternatively, nuts may be used to straddle the disc portion and the brush base instead of the hub. Alternatively, cups may be used instead of the discs. Alternatively, the bypasses 7 of the front seal 10 may be misaligned with the bypasses 7 of the rear seal 10.

When the pigtrain 1 is initially deployed in the coiled tubing 50 from the launcher, the bypass pig 1*b* may be in a first position closer to the lead pig 1*a* than the trail pig 1*c*, such as proximate to or abutting the lead pig 1*a*. As the pigtrain 1 proceeds through the coiled tubing 50, a portion of the working fluid 20 may flow (in the direction of arrow L) through the bypasses 7, thereby forcing the bypass pig 1*b* to gradually move (in the direction of arrow V) from the first position to a second position closer to the trail pig 1*c* than the lead pig 1*a*, such as proximate to or abutting the trail pig 1*c*, relative to the movement of the pigtrain 1 (in the direction of the propellant arrow P). The relative movement V of the bypass pig 1*b* may agitate A the working fluid 20 as the pigtrain 1 proceeds through the coiled tubing 50, thereby facilitating the removal of debris from the inner surface of the coiled tubing 50. Agitation A may occur circumferentially around the bypass pig 1*b* and longitudinally along the bypass pig 1*b*. The agitation A may also increase exposure of the coiled tubing inner surface to the working fluid 20 due to prevention of boundary layer formation along the inner surface. The agitation A may also remove debris from the bypass pig scraper.

Primary factors governing the relative velocity V of the bypass pig 1*b* may include the total bypass area, the pressure of the propellant P, the frictional force generated between the coiled tubing and the pigs 1*a-c*, and fluid properties of the working fluid. Once the relative velocity V is determined, an initial spacing between the bypass pig 1*b* and the trail pig 1*c* may be determined and accordingly the volume of working fluid 20. Advantageously, the volume of the working fluid 20 used may be substantially less than a volume of the tubular string 50, such as less than one-half, one-fourth, one-tenth, or one-hundredth of the volume of the tubular string.

The working fluid 20 may be liquid, gas, or a two-phase mixture, such as a colloid or solution. The working fluid 20 may be a detergent, such as a surfactant (i.e., dishwasher detergent) or basic solution (i.e., and alkaline solution), for a degreasing operation. The detergent may be an acidic solution, such as hydrochloric acid and water, for a descaling operation. The working fluid 20 may be water for rinsing the degreaser or a neutralizer, such as an aqueous ammonia solution, for neutralizing the acidic solution. The working fluid may also be a corrosion inhibitor, such as hexamine, phenylenediamine, dimethylethanolamine, cinnamaldehyde, condensation products of aldehydes and amines (imines), chromates, nitrites (i.e., sodium nitrite), phosphates, hydrazine, zinc oxide, and ascorbic acid.

Alternatively, the pigtrain 1 may be used as part of a multi-cycle regimen for treating, such as cleaning and/or coating, the coiled tubing 50. One regimen may include a first cycle including deploying the pigtrain 1 back and forth through the coiled tubing one or more times with a first working fluid, such as detergent, and a second cycle with a different second working fluid, such as water or neutralizer.

The regimen may be a multi-cycle cleaning regimen for cleaning and then sealing the coiled tubing 50 with a pressurized inert atmosphere, such as positive gauge pressure, inside the coiled tubing 50 to prevent corrosion thereof during storage. The pig train 1 may be deployed with the detergent, such as a surfactant or basic solution, for a degreasing cycle. The cycle may be repeated until a white-metal or near white-metal finish, such as NACE number one or two, is achieved. The pigtrain 1 may then be deployed with water for a rinse cycle. The pigtrain 1 may then be deployed with the corrosion inhibitor. The bypass pig 1*b* may then be deployed with dry air or nitrogen propellant for a drying cycle. A squeegee pig, such as a foam pig, may be deployed with nitrogen propellant for a nitrogen blanket cycle. The ends 55*i, o* may be sealed with the nitrogen blanket inside the coiled tubing 50 at positive gauge pressure and the coiled tubing 50 placed in storage.

The regimen may be a multi-cycle interior coating regimen for the coiled tubing 50. The regimen may include deployment of the pigtrain 1 with the detergent, such as a surfactant or basic solution, for a degreasing cycle. The pigtrain 1 may then be deployed with water for a rinse cycle. The pigtrain 1 may then be deployed with another detergent, such as an acidic solution, for descaling. The cycle may be performed until a white-metal or near white-metal finish, such as NACE number one or two, is achieved. The pigtrain 1 may then be deployed with the neutralizer. The bypass pig 1*b* may then be deployed with dry air or nitrogen propellant for a drying cycle. The pigtrain 1 may then be deployed with the corrosion inhibitor. The coating (not shown) may be applied by injecting liquid coating material, such as a polymer (i.e., epoxy, polyurethane, or polytetrafluoroethylene) between two extruder pigs (not shown) of a pigtrain and propelling the pigtrain using dry air or nitrogen through the coiled tubing 50.

Suitable pipeline extruder pigs are illustrated in FIGS. 3- 6 of the '842 patent. The pipeline extruder pigs may be modified for use in coiled tubing or reeled pipe by omitting the intermediate disc members 120 and 122 and shortening the base portion of 118 of the leading pig 112 and omitting the intermediate disc members 120*a* and 122*a* and shortening the base portion of 118*a* of the trailing pig 114. As the extruder pigs progress through the tubing 50, they may apply a uniform thickness coating of the material onto the interior surface of the tubing 50. After a layer of coating material has been applied, the coiled tubing 50 may be subjected to a drying or curing process to insure the coating bonds to the tubing 50. For instance, dry air may be passed through the tubing to dry the coating or the tubing may be subjected to heat to cure the lining material thereby creating a mechanical bond between the coating and the tubing 50. Additional layers may be applied. Each layer may have a thickness of less than 0.0015 inch and, if multi-layer, the aggregate thickness of the coating may be less than 0.004 inch.

Alternatively, a foam bypass pig (not shown) may be used instead of the mandrel bypass pig 1*b*. A suitable foam bypass pig is discussed and illustrated in FIGS. 1A and 1B of U.S. patent application Ser. No. 12/388,138, filed Feb. 18, 2009, which is hereby incorporated by reference in its entirety. In this alternative, the lead pig and trail pig may also be foam pigs (without a bypass). The foam bypass pig may include a body, a tail plate, one or more scrapers (i.e., brushes), and a bypass. The brushes may be tangentially spaced around an outer surface of the body, thereby defining a bypass between each brush. The brushes and bypasses may longitudinally extend from a tail of the body to a nose of the body.

Alternatively, the lead pig and trail pig may be a different kind of pig than the bypass pig and/or may or may not include a scraper, such as a brush. For example, the lead pig and trail pig may be simple spherical or foam pigs and the bypass pig may be the mandrel brush pig shown or the lead pig and trail pig may be brushless mandrel pigs and the bypass pig may be the mandrel brush pig shown.

Alternatively, the bypass 7 may be centrally disposed through the bypass pig 1*b*.

While the foregoing is directed to embodiments of the present invention, other and further embodiments of the invention may be devised without departing from the basic scope thereof, and the scope thereof is determined by the claims that follow.

The invention claimed is:

1. A method of treating a tubular string, comprising:

injecting working fluid between a lead pig and a trail pig of a pigtrain, wherein a bypass pig of the pigtrain is in a first position between the lead pig and trail pig and closer to the lead pig; and injecting propellant behind the trail pig, thereby driving the pigtrain through the tubular string, wherein the bypass pig gradually moves from the first position to a second position closer to the trail pig, thereby agitating the working fluid.

2. The method of claim 1, wherein the bypass pig is proximate to or abutting the lead pig in the first position and proximate to or abutting the trail pig in the second position.

3. The method of claim 1, further comprising:

loading the lead pig into a launcher connected to the tubular string;

loading the bypass pig into the launcher; and loading the trail pig into the launcher, wherein the working fluid is injected while the pigtrain is in the launcher.

4. The method of claim 1, wherein the tubular string is coiled tubing or reeled pipe.

5. The method of claim 1, wherein the working fluid is a detergent.

6. The method of claim 5, wherein the pigtrain is cycled through the tubular string until a white-metal or near white-metal finish is achieved.

7. The method of claim 1, wherein the working fluid is water.

8. The method of claim 1, wherein the working fluid is a corrosion inhibitor.

9. The method of claim 1, wherein the bypass pig comprises:

a scraper operable to engage and clean an inner surface of the tubular string; and a seal operable to engage the inner surface of the tubular string and having a bypass formed therethrough.

10. The method of claim 9, wherein:

the bypass pig further comprises a mandrel, the seal is disposed at a first end of the mandrel, the bypass pig further comprises a second seal disposed at a second end of the mandrel and having a bypass formed therethrough, and the scraper is disposed along the mandrel between the seals.

11. The method of claim 10, wherein the scraper is a brush helically extending along the mandrel.

12. The method of claim 10, wherein the lead pig and trail pig each comprise:

a mandrel;

a seal disposed at each end of the mandrel, wherein each seal is operable to engage the inner surface of the tubular string; and a scraper disposed along the mandrel between the seals, the scraper operable to engage and clean the inner surface of the tubular string.

13. The method of claim 9, wherein the lead pig and trail pig each comprise a seal operable to engage the inner surface of the tubular string.

14. The method of claim 1, wherein the bypass pig allows a portion of the working fluid to flow along an outer surface thereof.

15. A regimen for cleaning a tubular string, comprising:

a first cycle according to claim 1, wherein the working fluid is a first fluid;

a second cycle according to claim 1, wherein the working fluid is a second fluid different from the first fluid.

16. The regimen of claim 15, wherein:

the first cycle is a degreasing cycle and the first fluid is a surfactant or a basic solution, the second cycle is a rinse cycle and the second fluid is water, and the regimen further comprises:

an inhibitor cycle according to claim 1, wherein the working fluid is a corrosion inhibitor; and a drying cycle.

17. The regimen of claim 16, further comprising:

injecting nitrogen into the tubular string until a positive gauge pressure is achieved; and sealing ends of the tubular string.

18. The regimen of claim 16, further comprising:

a descaling cycle according to claim 1, wherein the working fluid is an acidic solution; and a neutralizing cycle a according to claim 1, wherein the working fluid is a neutralizer.

19. The regimen of claim 18, further comprising:

coating an inner surface of the tubular string with a polymer coating; and injecting dry air through the tubular string or heating the tubular string, thereby drying or curing the coating.

20. The method of claim 1, further comprising:

deploying a second pigtrain in series with the pigtrain, wherein injecting the propellant drives the pigtrains through the tubular string.

* * * * *